March 24, 1970   J. B. JESSUP ET AL   3,502,280
RETRACTOR DEVICE WITH SHIFTABLE BRAKE
Filed May 21, 1968   2 Sheets-Sheet 1
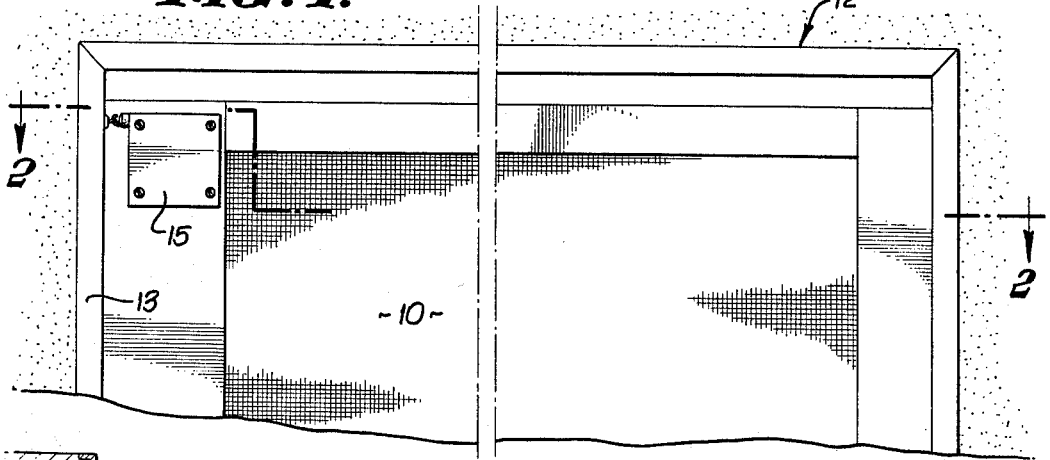
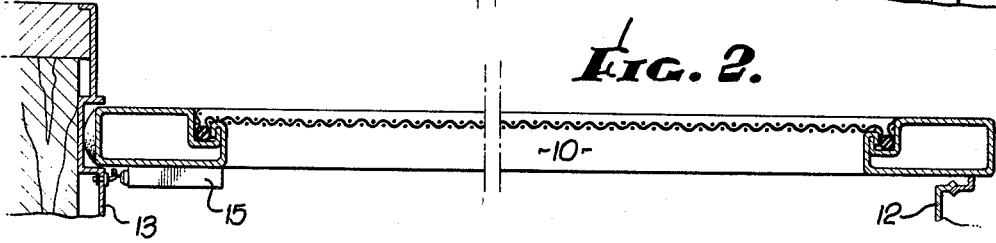
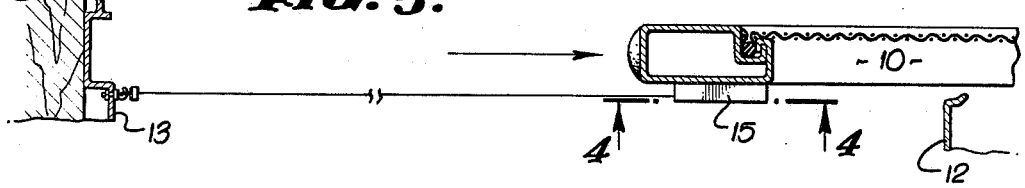
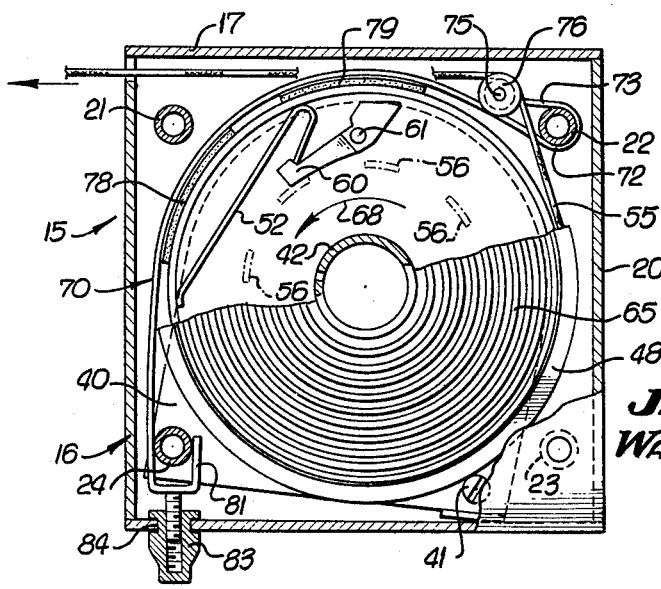
INVENTORS.
JAMES B. JESSUP
WALTER T. MATTHEWS
BY Huebner & Worrel
ATTORNEYS.

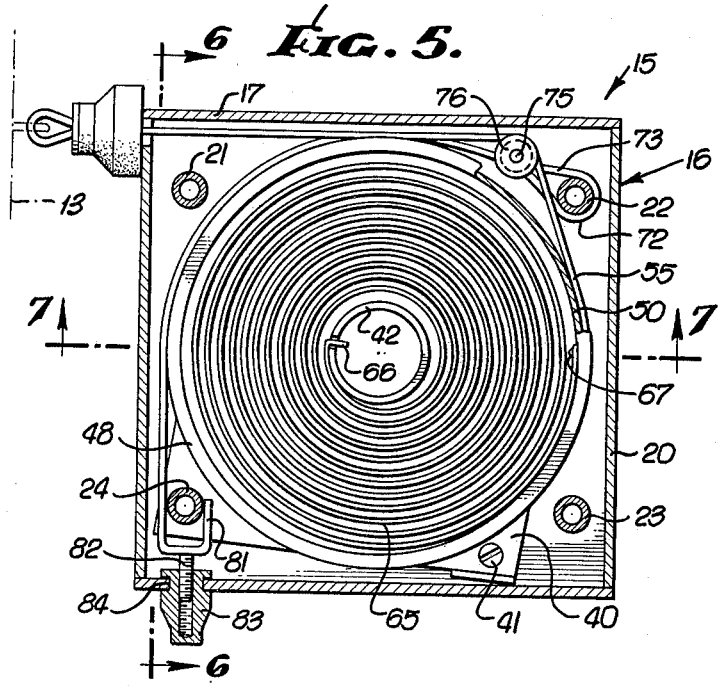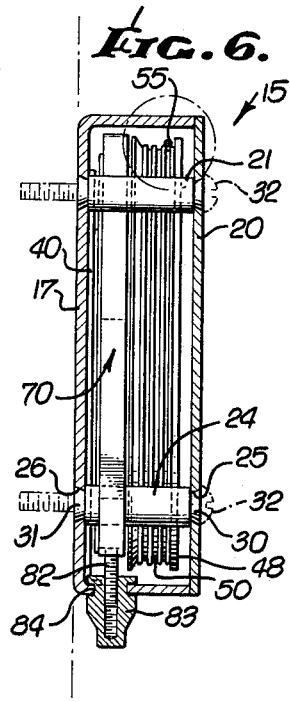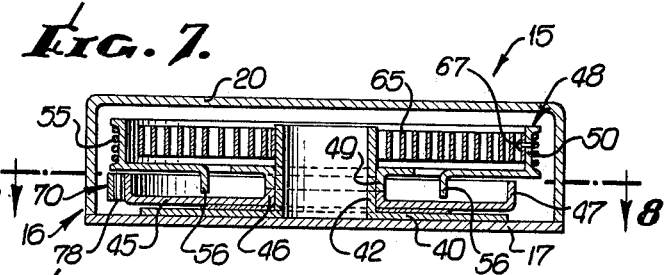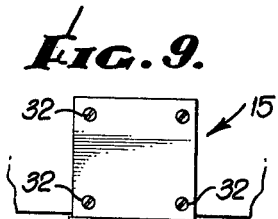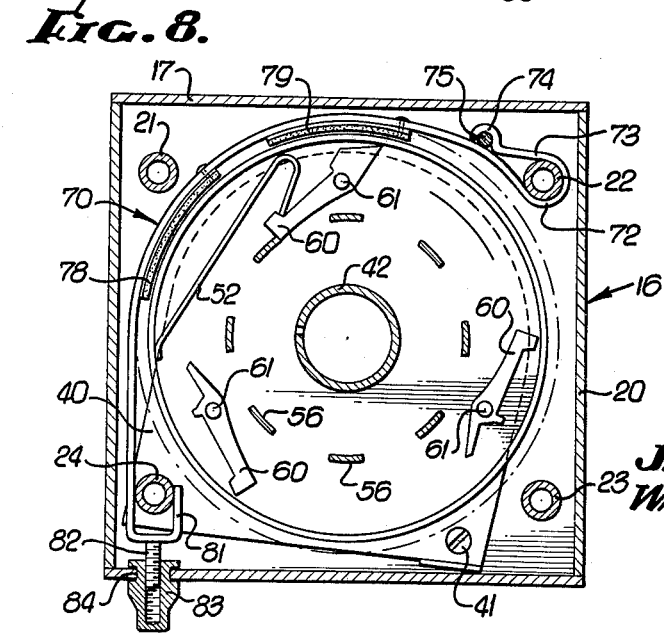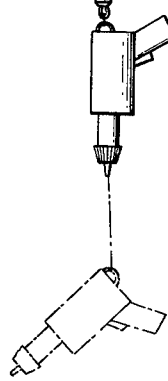
INVENTORS.
JAMES B. JESSUP
WALTER T. MATTHEWS
By Haebner & Worrel
ATTORNEYS.

United States Patent Office 3,502,280
Patented Mar. 24, 1970

3,502,280
RETRACTOR DEVICE WITH SHIFTABLE BRAKE
James B. Jessup, Los Angeles, and Walter T. Matthews, Van Nuys, Calif., assignors to Duplex, Inc., Los Angeles, Calif., a corporation of California
Filed May 21, 1968, Ser. No. 730,768
Int. Cl. B65h 75/48; F16d 63/00; E05f 1/08
U.S. Cl. 242—107.3                                                  6 Claims

ABSTRACT OF THE DISCLOSURE

The device is a cable retractor wherein a cable drum and a brake drum are interrelated in a manner whereby a cable may be unwound from the cable drum against opposition of a spiral spring but free of any braking action, a flexible band type brake being provided which is applied to the brake drum during wind up of the cable. The amount of braking force applied is controlled by cable tension acting on the brake.

BACKGROUND OF THE INVENTION

Field of the invention

Retractor devices of the general character disclosed have utility in conjunction with sliding screen doors, as an example, and for the suspension of work tools above a bench, and other environments wherein an object attached to the end of a cable may be moved by pulling on the cable against the action of a spiral spring. The purpose of the spring is to retract the object when the pulling force is released. In order to dampen and control the effect of the action of the spiral spring on the return winding of the cable, a braking mechanism is physically associated with the cable drum. This functions in a manner to interlock with the cable drum for common rotation in the windup direction of the cable. In the absence of a brake there would be a tendency for the spring to rapidly wind up the cable which, in the case of a screen door, would tend to slam it shut. The brake is utilized to slow and control the windup action of the spring and should function in a manner to impart the greatest braking action at the start of the retraction when the force of the spring is greatest, and reduce the braking action as the windup proceeds and the spring action force diminishes. The functional objective is a smooth even retraction, and, in the case of a screen door, for example, a soft closing thereof.

DESCRIPTION OF THE PRIOR ART

The most pertinent prior art known to applicants is U.S. Patent No. 3,332,638, granted Jan. 25, 1967, on an application of the same co-inventors who are the applicants hereto. In that patent a retractor device is disclosed embodying a cable drum and brake drum mounted on a common axle which protrudes from an axle plate which is pivoted in a housing. The axle plate, and consequently the axle, is adapted for shifting transversely of the axis of the axle. A brake band encircles the brake drum of the device, the ends of the brake band being fixedly secured in the housing. Tension on the cable to unwind it as it is withdrawn shifts the cable drum, and consequently the brake drum, in a direction to bring the brake drum into frictional engagement with the brake band. When pulling force on the cable is released the brake drum and the cable drum become automatically interlocked and a braking action is imparted to the interlocked drums. As the cable winds up and the tension of the spiral spring becomes less, the cable drum and brake drum on their common axle tend to shift toward the original position as limited by the pivotal mounting of the axle plate.

SUMMARY OF THE INVENTION

The present invention utilizes a cable drum and a brake drum rotatably mounted on a common axle, but the plate from which the axle protrudes is fixedly mounted and consequently the axis of the axle remains in a constant position. A stiffly flexible band brake is employed which is anchored at one end, and terminates generally diametrically opposite the anchor point in a unit which is operable to basically set the adjustment of the brake.

At one end region the brake band mounts a pulley over which the cable is trained. The bight of the cable over the pulley is such that force applied to the cable in unwinding it from the drum delivers through the pulley a force acting toward the center of the drums. This shifts the brake band toward the axis of the drums thereby shortening the effective length of the brake band and causing it to be applied against the brake drum.

As retraction proceeds and the general effect of the spiral spring lessens, the force imposed by the cable on the control pulley decreases and the brake tends to resume its unapplied position.

These and other features and objects of the invention will become further apparent from a consideration of the drawings and subsequent description.

BRIEF DESCRIPTION OF THE DRAWINGS

FIGURE 1 is the front elevation of a screen door assembly illustrating the retractor device applied thereto.

FIGURE 2 is a horizontal section taken on the line 2—2 of FIGURE 1.

FIGURE 3 is a view similar to FIGURE 2 showing the screen door opened and the cable of the retractor device extended.

FIGURE 4 is a vertical section of the retractor device with the parts shown in cable unwinding or unwound condition, as occurs in FIGURE 3.

FIGURE 5 is a view generally similar to FIGURE 4, but with the cable fully retracted.

FIGURE 6 is a vertical section taken on the line 6—6 of FIGURE 5.

FIGURE 7 is a horizontal section taken on the line 7—7 of FIGURE 5.

FIGURE 8 is a vertical section taken on the line 8—8 of FIGURE 7.

FIGURE 9 is an elevational view of the retractor device mounted on a fixed overhead support and retractably suspending a working tool.

DESCRIPTION OF THE PREFERRED EMBODIMENT

A typical sliding screen door 10 shown in FIGURES 1, 2 and 3 is mounted in a door frame 12 and closes on a door jamb 13. A retractor device 15 embodying the present invention is secured to the door 10.

The retractor 15 comprises a housing 16 in the general shape of a shallow, rectangular box, and includes a mating base member 17 and cover 20. Hollow spacing posts 21, 22, 23 and 24 axially aligned respectively with holes 25 and 26 in the base and cover provide for assembly of the base and cover by virtue of rivet heads 30 and 31. The tubular posts receive screws 32 which may be utilized to mount the retractor device on the screen door.

An axle plate 40 lies flat against the housing base member 17 and is rigidly held in place by the post 24 at one corner and by a machine screw 41 at another corner.

Protruding from the plate 40 is an axle 42.

Mounted for rotation on the axle 42 is a brake drum 45 which includes a hub 46 and a peripheral braking surface 47.

Coaxially mounted on the same axle is a cable drum 48 which includes a hub element 49 and a peripheral cable winding surface 50.

Wound on the peripheral surface of the cable drum is a cable 55. Arranged circumferentially around the axis of the hub 49 is a plurality of stop members 56 which extend into a hollow area of the brake drum 45. These stop members are adapted to be engaged by a ratchet pawl 60 pivotally mounted at 61 on the inner wall of the brake drum. A plurality of ratchet pawls preferably are provided, to afford minimum lost motion in having a ratchet pawl engage a stop. When the device is mounted vertically one of the pawls will swing by gravity into engagement with one of the stops. However, for horizontal mounting, assured action of at least one of the pawls is obtained by a biasing spring 52.

A spiral or coil spring 65 is confined within the cable drum, being anchored at its inner end at 66 to the stationary axle 42 and secured at its outer end by a rivet 67, or otherwise, to the peripheral band of the cable drum.

When the cable drum is being rotated in a counterclockwise direction, as illustrated by the arrow 68 in FIGURE 4, the stop members 56 slide past the ratchet pawls 60 permitting the drum to rotate as the cable unwinds with a free wheeling relative to the brake drum. As the cable unwinds, the spiral spring 65 is wound tighter. When the cable unwinding force is discontinued, whereby the cable drum is permitted under the influence of the spiral spring to rotate in a clockwise direction, as seen in FIGURE 8, one of the ratchet pawls 60 abuts against one of the stop elements 56, and thus interlocks the cable drum and the brake drum for simultaneous clockwise rotation, as seen in FIGURE 8.

A brake 70 comprising a semicircular stiffly flexible band is anchored at one end on the post 22. This is achieved by forming a loop 72 to encircle the post 22. The outer end section 73 of the loop is formed with a constriction 74. The latter, in conjunction with the adjacent outer surface of the brake band, mounts an axle 75 for a pulley 76 which is freely rotatable on the axle. It should be noted that the inner surface of the brake band at the region of the pulley 76 is spaced outwardly away from the outer surface of the cable drum.

The brake band is disposed in a plane overlying relation to the peripheral surface 47 of the brake drum whereby it may frictionally engage the same. This may be metal to metal contact, or we may provide brake shoes 78 and 79 of a specially adapted material. The latter is described in greater detail in a copending application filed by one of the joint inventors here, Ser. No. 730,877, filed May 21, 1968.

The opposite end of the brake band is is formed with a U-shaped terminal element 81 which straddles and is generally positioned by the hollow post 24. It is provided with a threaded stud 82 engaged by a nut 83. The latter is formed with an annular channel 84 the opposing walls of which engage opposite surfaces of the housing member 20. Rotation of the nut will loosen the brake band or set it tighter, as may be desired.

In operation, when the cable is unwound, as for example by opening a screen door as shown in FIGURE 3, the cable, by reason of its bight around the pulley 76, depresses the brake band, placing it in braking contact against the brake drum. However, there is no braking action imparted to the cable drum because the cable drum rotates freely of the brake drum in the unwinding direction. When the pulling force is discontinued, the tension on the spiral spring 65 imposes a rewinding action on the cable. As the cable drum begins to turn in the rewinding direction it becomes interlocked with the brake drum through the agency of the stop elements 56 and the ratchet pawls 60, and the braking action is consequently imparted to the cable drum to slow the rewind speed.

As the rewind progresses, the force of the spiral spring lessens, the pressure of the cable on the pulley 76 decreases, and the brake band is gradually freed of the braking pressure. The device can be so adjusted in relationship to the screen door operated on that the closing of the door is smoothly and evenly accomplished.

The retractor device clearly can be used for a variety of purposes, as for example, a sliding glass door, or other sliding doors.

Although we have herein shown and described our invention in what we have conceived to be the most practical and preferred embodiment, it is recognized that departures may be made therefrom within the scope of our invention.

What we claim is:

1. In a retractor device comprising a cable drum and a brake drum independently mounted on a common fixed axle, a coil spring biasing the cable drum for rotation in a windup direction, a cable wound on the cable drum in a direction to be unwound in opposition to the force of the coil spring, engagement means between the two drums whereby the cable drum is interlocked with the brake drum to drive the latter only when the cable drum is rotating in windup direction, the improvement which comprises: a band type braking element mounted in position to impose braking action on the brake drum, a brake actuating element engaging the braking element, the cable being in engagement with said actuating element and adapted by application of tension on the cable to depress the braking element into braking engagement with the brake drum whereby braking action is imparted to the cable drum when the latter is rotating in windup direction against a load on the cable.

2. A device as defined in claim 1 in which the braking element comprises a stiffly flexible generally semi-circular band with at least one tangential extension, means securing the band at both ends, and the brake actuating element is disposed along said tangential extension, application of tension on the cable serving to depress the band toward the brake drum.

3. A device as defined in claim 2 wherein the brake actuating element embodies a pulley, means mounting the pulley on the band, and the cable is trained in a bight over the pulley.

4. A device as defined in claim 2 wherein the semi-circular band has a tangential extension at each end, the means securing the band at one end is fixed, and the means securing the band at the other end is adjustable to tighten or loosen the brake.

5. A device as defined in claim 4 wherein the brake actuating element embodies a pulley, means mounting the pulley on the band, and the cable is trained in a bight over the pulley.

6. A device as defined in claim 2 in which the means securing the band at one of said ends embodies an adjustable anchorage for tightening or loosening the band in relation to the brake drum.

References Cited

UNITED STATES PATENTS

| | | | |
|---|---|---|---|
| 2,079,054 | 5/1937 | Vadasz | 188—82.1 XR |
| 2,112,650 | 3/1938 | Girard | 16—198 |
| 2,603,430 | 7/1952 | Hofer | 242—107.3 |
| 3,020,580 | 2/1962 | Glenn | 242—107.3 XR |
| 3,021,089 | 2/1962 | Becker | 242—107.3 |
| 3,042,339 | 7/1962 | Gschwind | 242—107.4 |

STANLEY, N. GILREATH, Primary Examiner

WERNER H. SCHROEDER, Assistant Examiner

U.S. Cl. X.R.

16—78; 188—82.6; 242—99